June 28, 1966 J. R. CROOKSTON 3,257,671

SHINGLING TOOL WITH ADJUSTABLE GUIDE

Filed July 29, 1964

INVENTOR.
JAMES R. CROOKSTON
BY Oldham & Oldham
ATTYS.

United States Patent Office 3,257,671
Patented June 28, 1966

3,257,671
SHINGLING TOOL WITH ADJUSTABLE GUIDE
James R. Crookston, 632 Yerrick Road, Akron, Ohio,
Filed July 29, 1964, Ser. No. 386,038
5 Claims. (Cl. 7—8.1)

This invention relates to a shingling tool with an adjustable guide, and more particularly to a unique configuration for the adjustable guide whereby the guide is securely locked in place at any desired gaging position.

The art of providing shingling tools with adjustable guides is rather well known and of long duration. United States Patent No. 169,836 discloses a shingling hatchet with a slot through which a clamping screw of an adjustable gage is located. However, this apparatus operates on the principle of clamping the bifurcated end of the gage into tight relationship over the bladed portion of the shingling tool. This means the gage extends above the substantially straight top edge of the tool causing a cumbersome obstruction. Further, the clamping of the bifurcated arms cannot provide the secure clamping action necessary for rough and continuous shingle gaging operation. Patent No. 832,962 discloses a gaging apparatus which utilizes a plurality of spaced holes to adjust the position of the gage with respect to the blunt hitting head of the tool. This degree of adjustability is not as great nor as desirable as is needed by the art today. Patent No. 1,174,120 discloses a complicated gaging mechanism for a shingling hatchet which again utilizes the undesirable principle of a substantially bifurcated gage which extends over the straight top edge of the tool to cause problems in the use thereof.

It is the general object of the present invention to avoid and overcome the foregoing and other difficulties of and objections to prior art practices by the provisions of a shingling tool which utilizes a substantially conventional hatchet head design with an elongated slot in the flat bladed portion which receives a knurled gage on either side thereof, and where the knurled gage is securely positioned with respect to the flat bladed portion by a shake-proof pyramidal lock washer on one side thereof, and pointed projections engaging opposed sides of the slot on the other side thereof.

A further object of the invention is to provide a shingling tool with an adjustable gage where one portion of the gage is a bolt having a knurled head and a threaded shank which shank is slidably received through an elongated slot in the bladed portion of the tool and whereby a lock washer is placed between the knurled head and one side of the bladed portion with a knurled nut having pointed projections extending from one surface thereof threadably received on the shank of the bolt so the pointed projections engage the other side of the bladed portion when the nut is fully screwed onto the shank of the bolt.

A further object of the invention is to provide a shingling tool whereby a cutting blade is slidably carried in a groove in the flat bladed portion and held securely in position by screws engaging a cover plate thereover.

A further object of the invention is to provide a shingling tool having an adjustable gage, which gage is highly effective in operation, selective to a desired gaging distance readily and easily, and which tool is sturdy, highly effective in operation, and yet low in cost.

A further object of the invention is to provide a shingling tool with an adjustable gage which will be of considerable value to a person using the tool by increasing accuracy, and providing a highly reliable, sturdy and effective shingling tool.

The aforesaid objects of the invention and other objects which will become apparent as the description proceeds are achieved by providing in a shingling tool the combination of a head having a blunt forward portion, a substantially flat rearward bladed portion, and a substantially straight top edge with an elongated slot in the bladed portion substantially parallel to the top edge, a handle mounting the head for swinging thereof, a bolt with a knurled head and a threaded shank having the shank slidable positioned through the slot, a lock washer between the knurled head and one side of the bladed portion, and a knurled nut having pointed projections engaging the other side of the bladed portion and integral extending lugs slidably received in the slot on opposed sides of the shank of the bolt, said nut being threadably received on the shank.

For a better understanding of the invention reference should be had to the accompanying drawings wherein.

Figure 1:
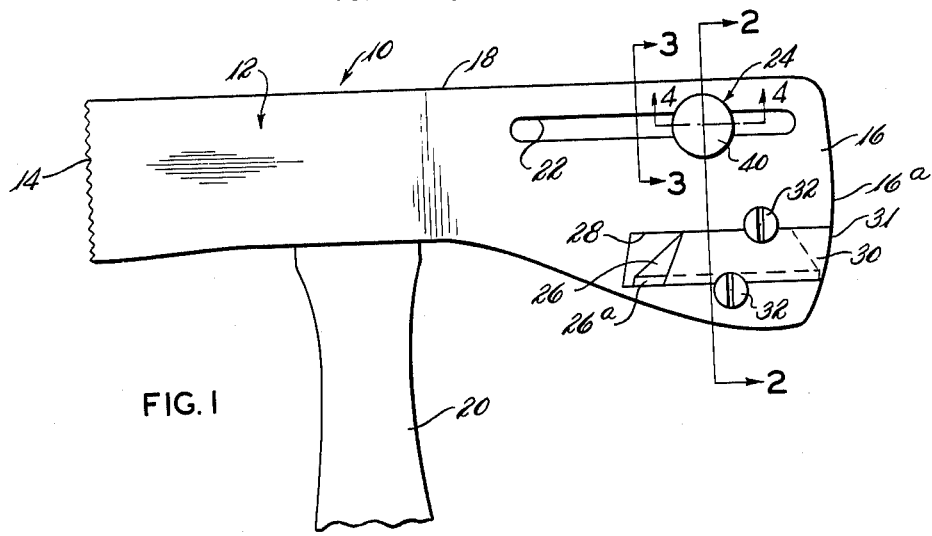
FIGURE 1 is a broken away plan view of a shingling tool comprising a preferred embodiment of the invention.

With reference to the form of the invention illustrated in FIGURE 1 of the drawings, the numeral 10 indicates generally a shingling tool comprising a head, indicated generally by numeral 12. The head 12 has a substantially square blunt forward portion 14 normally utilized for hammering, and a flat bladed rear portion 16 with a substantially straight top edge 18 therebetween. The head 12 is mounted for swinging at a point of balance between the blunt portion 14 and the blade 16 by means of a handle 20, normally made from a suitable wood.

The objects of the invention are achieved by providing an elongated slot 22 in the flat blade portion 16 extending substantially the length thereof and being substantially parallel to the straight top edge 18. A gage mechanism, indicated generally by numeral 24 is securely, but adjustably positioned in the slot 22. As a feature of the invention, a cutter blade 26 is slidably received in a wide shallow groove 28 which is substantially parallel to the elongated slot and open at the edge of the bladed portion 16. The groove 28 is of sufficient depth so that a cutting edge 26a on the blade 26 is about on the centerline of the bladed portion 16. In order to hold the blade 26 in position, a metal plate 30 is slidably received in the groove 28 over the blade 26 and extends slightly above the surface of the flat bladed portion 16. A pair of screws 32 have one edge thereof overlapping the plate 30 and when screwed tightly into position firmly hold the blade 26 as desired. The plate 30 has a forward edge 31 which conforms in contour to the forward edge 16a of the bladed portion 16. This means that a material to be cut when the blade 26 is slidably moved to a cutting position will be supported on both sides of the blade 26 to thereby provide a much improved cutting action. Of course, the plate 30 allows the blade 26 to be positioned thereunder unexposed for tool storage or slidably positioned any distance outwardly to provide a desired cutting depth.

Figures 2, 3:
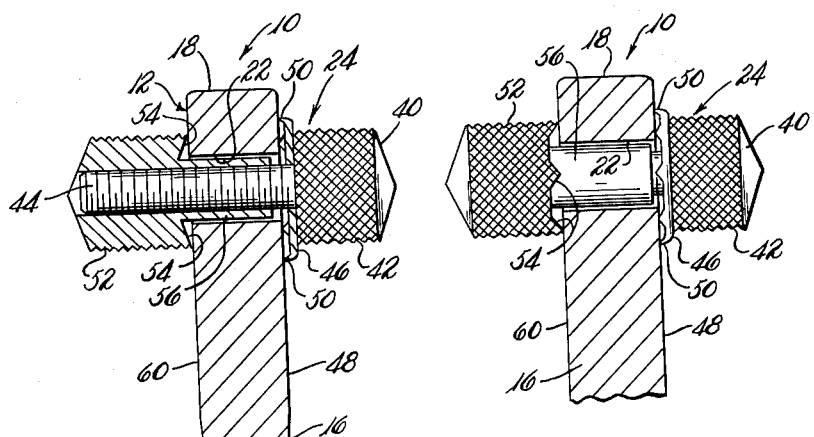
FIGURE 2 is an enlarged vertical cross sectional view of the adjustable gage and cutting blade mechanism taken on line 2—2 of FIGURE 1.
FIGURE 3 is a broken away enlarged vertical cross sectional view of the adjustable gage mechanism taken on line 3—3 of FIGURE 1.

For a better understanding of the essential features of the gage mechanism 24, reference should be had to FIGURE 2 wherein it is seen that the gage mechanism 24 includes a bolt, indicated generally by numeral 40, which bolt 40 includes a knurled head 42 and a threaded shank 44. The shank 44 is slidably received through the slot 22, as illustrated. A pyramidal type shake-proof lock washer 46 is placed between the head 42 and a face 48 of the bladed portion 16. The washer 46 utilizes a plurality of pointed projections 50 which engage the face 48 to secure the desired locking action. In order to complete the gage mechanism, a knurled nut 52 having an inverted conically shaped bottom surface defining defining pointed projections 54 from the bottom surface thereof and an extended lug 56 slidably received in the slot 22 is provided to be threadably received onto the shank 44 of the bolt 40.

Figure 4:
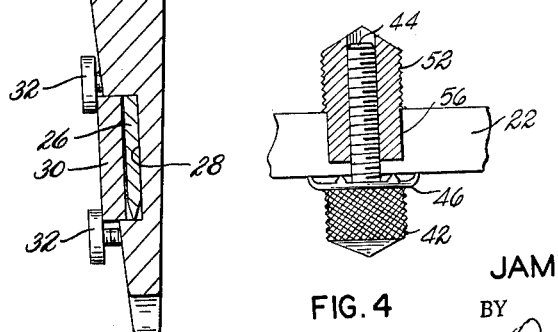
FIGURE 4 is a broken away enlarged horizontal cross sectional view of the adjustable gage mechanism taken on line 4—4 of FIGURE 1.

It is an important feature of the invention that the nut 52 and the head 42 both be of approximately the same size and configuration so that the gage 24 will present the same appearance on both sides of the bladed portion 16. Of course, further it should be understood that the extending lug 56 is integrally formed with the nut 52 so that its extension into the slot 22 prevents the nut 52 from rotating. This is because lug 56 is of the same lateral width as the nut 52, as clearly shown in FIGURE 4. Thus, the threaded shank 44 must be screwed into the nut 52 rather than the nut 52 screwed onto the shank 44. Of course this is easily accomplished by rotating the head 42 of the bolt 40. The invention contemplates that the pointed projections 54 on the nut 52 will engage on opposed sides of the slot 22 and bite thereinto when the shank 44 is screwed tightly into the nut 52 to urge the nut 52 towards the head 42 and thereby create a pinching action on both sides of the bladed portion 16.

Therefore, since the lug 56 prevents rotation of the nut 52, it means that the pointed projections 54 will securely bite into the other side 60 of the bladed portion 16 on opposed side of the slot 22, as clearly indicated in FIGURE 3. The invention anticipates that at least the projections 54 of the nut 52 will be of slightly harder material than the bladed portion 16 so that the pointed projections 54 may securely bite thereinto which will insure the anchored relationship of the gage 24 to the bladed portion 16 at the desired relative position on the slot 22.

Thus, it is seen that the pointed projections 54 on the nut 52 in combination with the locking washer 46 having the projections 50 will securely position the gage 24 in relation to the slot 22 when the head 42 of the bolt 40 is properly rotated to screw the shank 44 into the nut 52.

FIGURE 3 clearly shows the extended relation of the projecting lug 56 of the nut 52 and how this lug prevents the nut 52 from rotation. It should be noted that the lug 56 does not extend far enough so that it will engage the bottom side of the washer 46. This will always insure that an extremely tight locking connection of the gage 24 in relation to the slot 22 can be secured.

The invention contemplates that in place of the projections 54 on the nut 52, the bottom of the nut 52 could be cross hatched or knurled to engage a complementary surface on the face 60 of the bladed portion 16. The cross hatching or knurling would then be sufficient to hold the nut 52 in position when it was tightly screwed onto the shank 44 of the bolt 40.

Thus, it is seen that the objects of the invention have been achieved by providing a shingling tool which utilizes an adjustable gage on both sides of the blade, the gage is generally knurled and made in a cylindrical shape, and the gage on each side of the blade is of substantially the same shape. It is an important feature that the adjustable gage does not extend above the substantially straight top surface 18 of the head 12. Because of the pointed projections 54 on the nut 52, and the lock washer 46, the gage 24 can be securely locked into place with the head 42 of the bolt 40 turning to effect the lock without the nut 52 rotating because of the projecting lug means 56.

The cover plate 30 not only protects the blade 26, but allows secure positioning thereof in the groove 28 by means of the screws 32. Further the edge 31 of the plate 30 provides a support for material to be cut by the edge 26a of the blade 26. The blade 26 may be positioned under the plate 30 for storage or moved outwardly and clamped to provide any desired cutting depth.

While in accordance with the patent statutes only one best known embodiment of the invention has been illustrated and described in detail, it is to be particularly understood that the invention is not limited thereto or thereby, but that the inventive scope is defined in the appended claims.

What is claimed is:
1. In a shingling tool the combination of
 an elongated head having a substantially straight top edge, a flat bladed rear portion, and a blunt square shaped forward portion for hammering, said head having a closed elongated slot extending substantially parallel to the top edge along the length of the bladed rear portion,
 a handle mounting said head for swinging thereof,
 a bolt having a threaded shank extending through the slot, said bolt having a knurled head abutting one face of the bladed rear portion to act as a gage,
 a shake-proof pyramidal lock washer slidably received on the shank of the bolt and positioned between the knurled head of the bolt and the one face of the bladed rear portion, and
 a nut threadably received on the threaded shank of the bolt, said nut having an inverted conically shaped bottom surface in engagement with the other face of the flat bladed portion, said nut having integral lug means slidably extending into the elongated slot to prevent rotation of the nut, said nut having substantially the same shape as the knurled head of the bolt so as to act as a gage.
2. In a shingling tool the combination of
 a head having a blunt forward portion, a substantially flat rearward bladed portion, and a substantially straight top edge with an elongated slot in the bladed portion substantially parallel to the top edge,
 a handle mounting the head for swinging thereof,
 a bolt with a knurled head and a threaded shank having the shank slidably positioned through the slot,
 a lock washer between the knurled head and one side of the bladed portion, and
 a knurled nut having pointed projections engaging the other side of the bladed portion and extending lug means slidably received in said slot for cooperation with the opposite sides thereof, and said nut threadably received on said shank.
3. In a shingling tool the combination of
 a head having a blunt forward portion, a substantially flat rearward bladed portion, and a substantially straight top edge with an elongated slot in the bladed portion substantially parallel to the top edge,
 a handle mounting the head for swinging,
 a knurled gage having pointed projections engaging on one side of the bladed portion on opposed sides of the elongated slot, and said gage further including an integral lug means slidably received into said slot to prevent rotation of said gage, and
 a bolt having a knurled head and a threaded shank with the shank slidably received in the slot and threadably received by the gage so as to draw the gage and the knurled head towards each other to effect an opposed pinch on each side of the bladed portion of the head, said knurled head being the same size and configuration as said knurled gage.
4. In a tool the combination of
 a head having a blunt forward portion, a substantially flat rearward bladed portion, and a substantially straight top edge with an elongated slot in the bladed portion substantially parallel to the top edge,
 a handle mounting the head for swinging thereof,
 a bolt with a knurled head and a threaded shank having the shank slidably positioned through the slot,
 interlocking means between the knurled head and one side of the bladed portion when the head is firmly positioned thereagainst, and a knurled nut, integral-interlocking means extending from the nut and interlocking with the other side of the bladed portion when the nut is positioned thereagainst and said nut having integral extending lug means slidably received in said slot for cooperation with the opposite sides thereof, and said nut threadably received on said shank.

5. In a tool having an adjustable gage for measuring lengths the combination of a head having a blunt forward portion, a substantially flat rearward bladed portion, and a substantially straight top edge with an elongated slot in the bladed portion substantially parallel to the top edge, a handle mounting the head for swinging, a gage having pointed projections slidably and adjustably engaging on one side of the bladed portion on opposed sides of the elongated slot, and said gage further including an integral lug means slidably received into said slot to prevent rotation of said gage, and a bolt having a head and a threaded shank with the shank slidably received in the slot and threadably received by the gage so as to draw the gage and the bolt head towards each other to effect an opposed pinch on each side of the bladed portion of the head, said bolt head being the same size and configuration as said gage, and each defining an adjustable length from the blunt forward portion of the head.

References Cited by the Examiner

UNITED STATES PATENTS

| | | |
|---|---|---|
| 169,836 | 11/1875 | Perry. |
| 832,962 | 10/1906 | Fellows. |
| 1,355,373 | 10/1920 | White _____ 151—37 |
| 1,371,742 | 3/1921 | Dringman _____ 151—35 |
| 2,104,250 | 11/1938 | Williams _____ 145—3 |
| 2,500,629 | 3/1950 | Crookston. |
| 2,500,639 | 3/1950 | Crookston _____ 145—3 |
| 2,729,889 | 1/1956 | Trinski _____ 145—3 |
| 2,794,476 | 6/1957 | Hanneman _____ 151—35 |

WILLIAM FELDMAN, Primary Examiner.

R. V. PARKER, JR., Assistant Examiner.